April 8, 1924.
M. KASSER
MACHINE FOR PROCESSING EGGS
Filed April 24, 1920
1,489,944
5 Sheets-Sheet 1
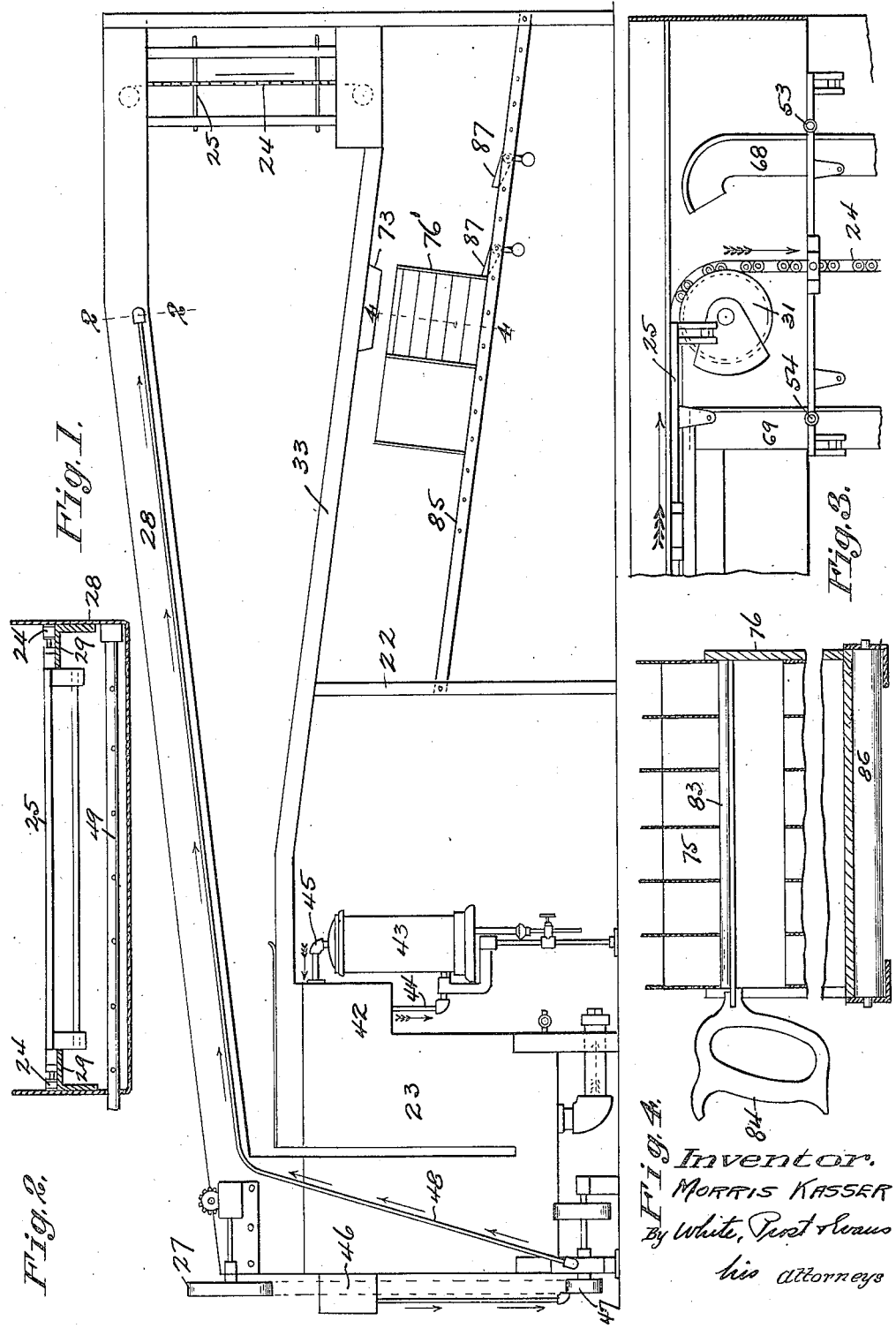

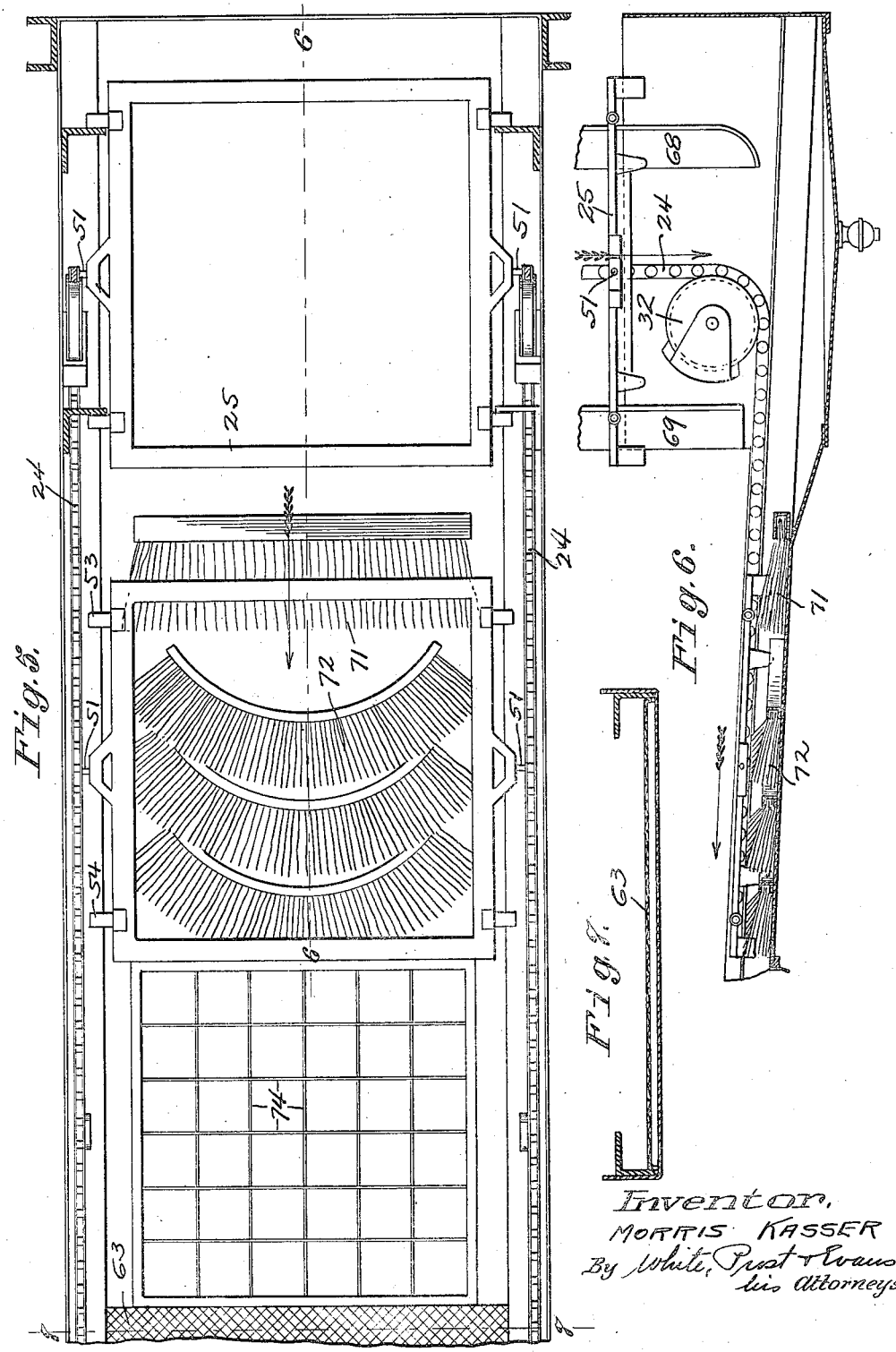

April 8, 1924.                                                           1,489,944
M. KASSER
MACHINE FOR PROCESSING EGGS
Filed April 24, 1920      5 Sheets-Sheet 3
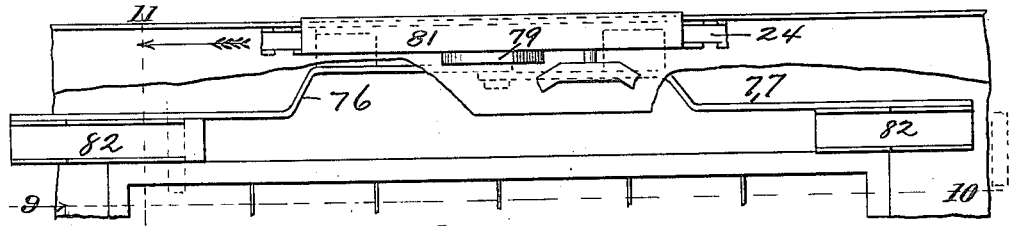
Fig.8.    Fig.9.
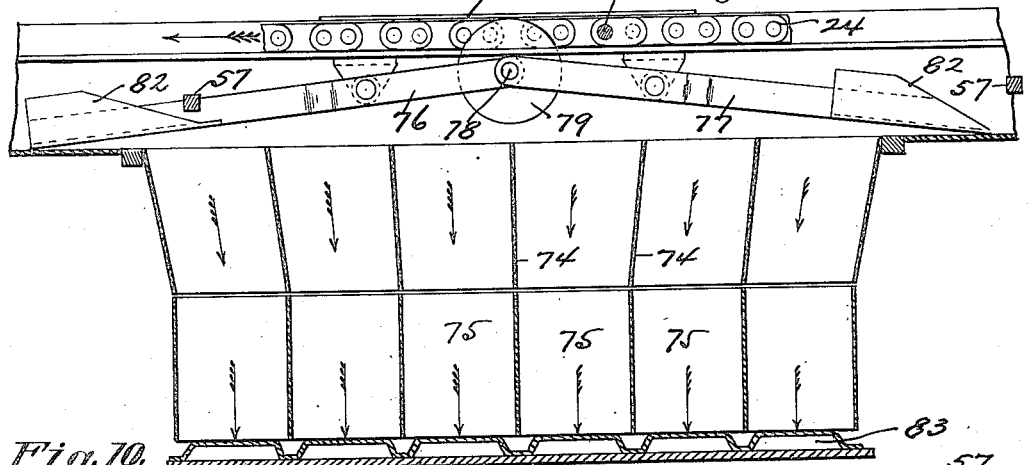
Fig.10.
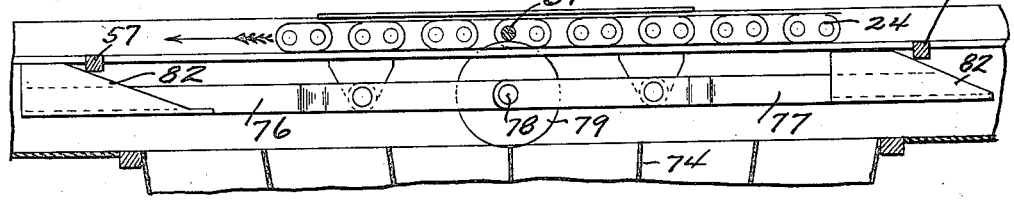
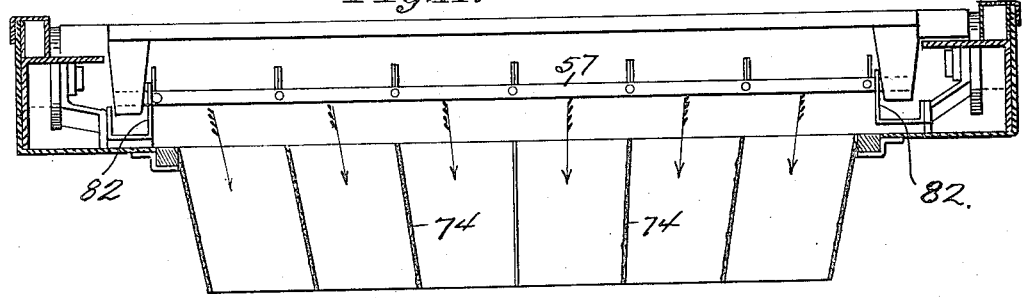
Fig.11.
Inventor.
MORRIS KASSER
By White, Prest & Evans
his Attorneys.

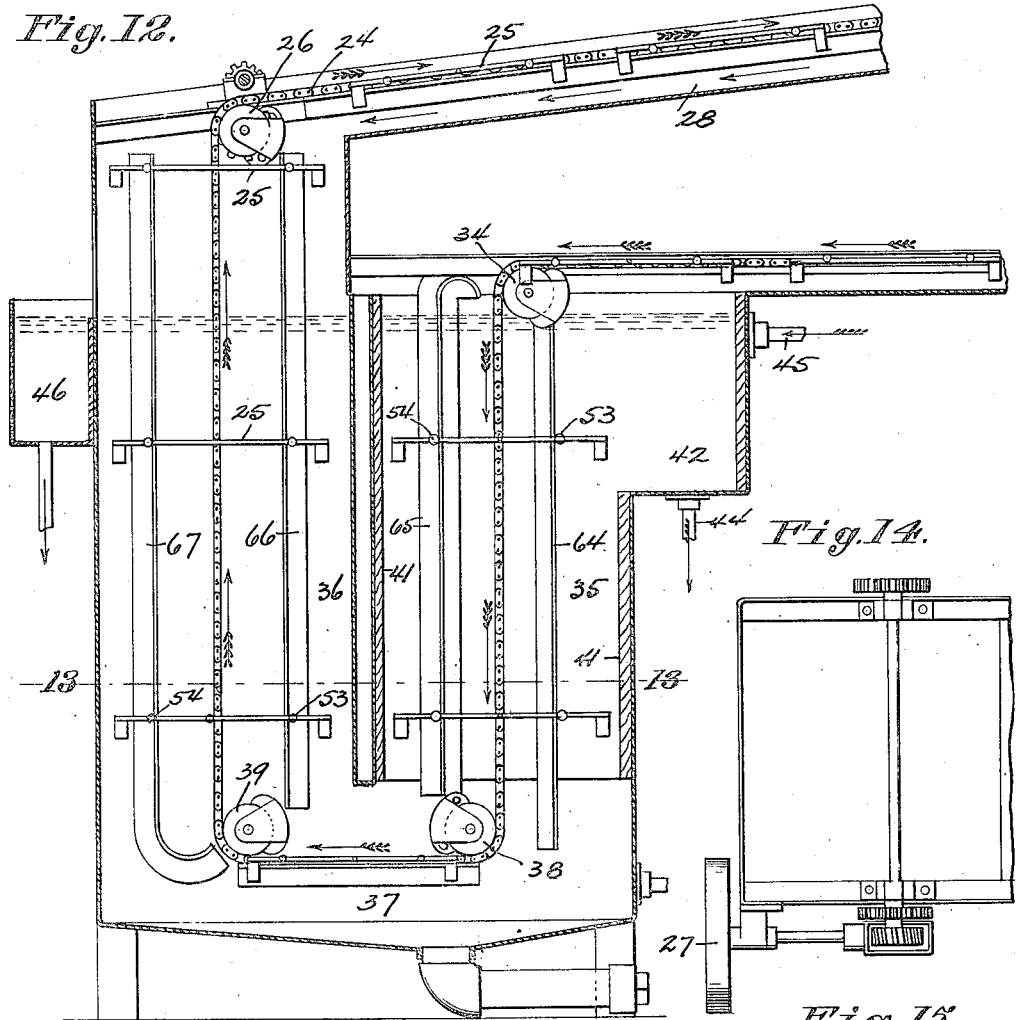

April 8, 1924.
M. KASSER
MACHINE FOR PROCESSING EGGS
Filed April 24, 1920   5 Sheets-Sheet 5
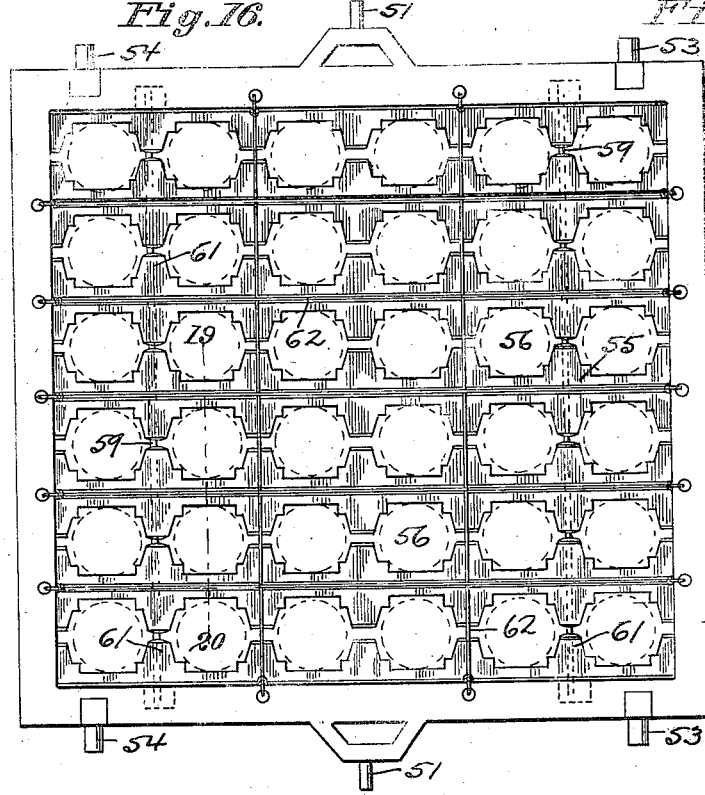
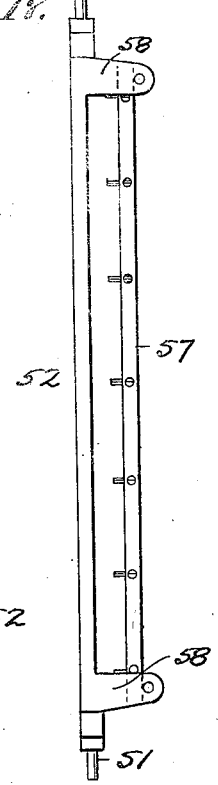
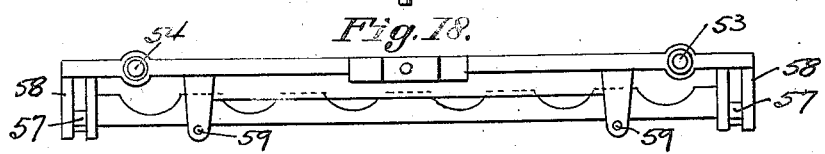
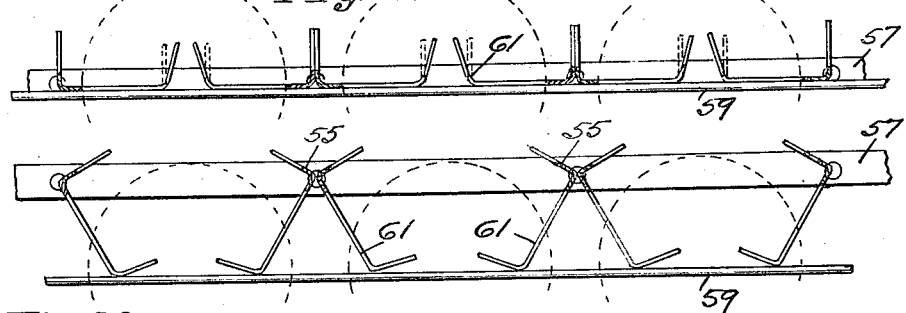
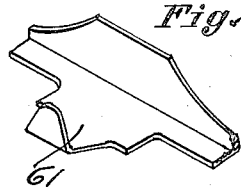
Inventor.
MORRIS KASSER
by White, Prost & Evans
his attorney Patented Apr. 8 1924.

1,489,944

UNITED STATES PATENT OFFICE.

MORRIS KASSER, OF SAN FRANCISCO, CALIFORNIA, ASSIGNOR TO KASSER EGG PROCESS CO., OF SAN FRANCISCO, CALIFORNIA, A CORPORATION OF CALIFORNIA.

MACHINE FOR PROCESSING EGGS.

Application filed April 24, 1920. Serial No. 376,238.

*To all whom it may concern:*

Be it known that I, MORRIS KASSER, a citizen of the United States, and a resident of the city and county of San Francisco and State of California, have invented a new and useful Machine for Processing Eggs, of which the following is a specification.

The invention relates to a machine for processing eggs or for treating eggs to increase their preserving qualities.

An object of the invention is to provide a machine for treating eggs to seal the shells thereof.

Another object of the invention is to provide a machine for introducing a sealing liquid, into and through the shells of the eggs.

A further object of the invention is to provide a machine in which the sealing liquid is maintained in proper condition for accomplishing the sealing operation.

A further object of the invention is to provide means for discharging the eggs from the machine after they have been treated.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one specific form of machine of my invention, but it is to be understood that I do not limit myself to such form, since the invention, as set forth in the claims, may be embodied in a plurality of forms.

Generally considered, my invention comprises a conveyor for moving the eggs into and through a liquid which is maintained at different temperatures at different zones. The eggs are first submerged in the liquid in the hot zone and moved, while maintaining their submergence into the cold zone, and they are removed from the liquid at the cold zone. The introduction of the eggs into the liquid at the hot zone causes an expansion of the contents of the shell, so that air within the shell is driven outward through the pores of the shell. The egg is then moved, while submerged, into the cold zone, causing the contents of the shell to contract and draw liquid into and through the pores of the shell. The pores of the shell are not only filled with the sealing liquid, but liquid passes through the pores into the egg and forms a sealing film on the inner side of the shell, which prevents absorption of gases or odors by the egg and greatly increases its preserving qualities. The sealing liquid which I employ is preferably a vegetable oil, such as cotton-seed oil, but other sealing liquids and solutions are known and have been proposed and I do not limit myself in any manner to the specific liquid through which the eggs are passed.

The machine generally provides means for draining the eggs after they are removed from the liquid and for wiping any excess liquid therefrom and for discharging them from the conveyor into boxes or crates for shipment or storage.

One form of machine of my invention is shown in the accompanying drawings, in which Figure 1 is a side elevation of the complete machine.

Figure 2 is a cross section of the upper trough taken on the line 2—2, Fig. 1.

Figure 3 is a longitudinal section of the upper end of the upper trough.

Figure 4 is a cross section of the egg discharging device taken on the line 4—4, Fig. 1.

Figure 5 is a plan view of the lower end of the lower conveyor runway showing the egg-wiping means and the egg discharge apertures.

Figure 6 is a longitudinal section taken on the line 6—6, Figure 5.

Figure 7 is a cross-section of the lower conveyor runway taken on the line 7—7, Fig. 5.

Figure 8 is a plan view of one side of the lower conveyor runway at the egg-releasing station.

Figure 9 is a longitudinal section of the lower runway and egg-releasing means taken on the line 9—10, Fig. 8, the parts being in normal position.

Figure 10 is a similar view showing the parts in position to release the eggs from the conveyor.

Figure 11 is a cross-section taken on the line 11—11, Fig. 8.

Figure 12 is a vertical section through the solution tank showing the conveyor extending therethrough, taken on the line 12—12, Fig. 13.

Figure 13 is a cross section of the tank taken on the line 13—13, Fig. 12.

Figure 14 is a plan view of a portion of the tank showing the conveyor-driving means.

Figure 15 is an elevation of the mechanism shown in Fig. 14.

Figure 16 is a plan view of the egg carrying frame or basket.

Figure 17 is an end view of the basket.

Figure 18 is a side view of the basket.

Figure 19 is a cross-section of the basket taken on the line 19—20, Fig. 16, showing the parts in egg-retaining position.

Figure 20 is a similar view showing the parts in egg-releasing position.

Figure 21 is a perspective view of a fragment of one of the egg-holding plates of the basket.

The machine of my invention comprises a suitable frame 22 upon which is arranged an endless conveyor which passes through the liquid tank 23, which is preferably arranged at one end of the frame. The conveyor in the present instance comprises two endless chains 24, driven synchronously and connected together at intervals by containers or baskets 25 in which the eggs are placed. The chains are guided over suitable rollers and are driven by sprockets 26 connected to the pulley 27 which is driven by any suitable source of power. The upper portion of the frame comprises a trough 28 through which the conveyor moves as it emerges from the liquid tank 23. The trough inclines upwardly from the tank so that all liquid draining from the eggs and the conveyor flows back into the tank. The trough is provided on opposite sides with trackways 29 for the chains 24. At the upper end of the trough 28, the chains pass over rollers 31 and pass downwardly and thence under the rollers 32 and thence up the lower inclined conveyor runway 33 and over the rollers 34 into the tank.

The tank 23 is divided into two compartments 35—36 separated from each other except at the bottom, where they are connected by the passage 37. The chains pass downwardly in compartment 35 under the rollers 38, through the passage 37, under the rollers 39 and up through compartment 36, passing over the driven sprockets 26. The tank 23 is substantially filled with the liquid with which the eggs are to be treated. The liquid in compartment 35 is heated at the top of the compartment, preferably to a temperature of approximately 185° F. and the liquid in compartment 36 is kept cool. The compartment 35 is lined with wood or other heat insulating material 41 to retain the heat in the liquid therein and the adjacent walls of compartments 35 and 36 are separated by an air space to minimize the transfer of heat to the liquid in compartment 36.

The compartment 35 is provided with an enlarged or offset portion 42 at the top and liquid from this portion circulates through the liquid heater 43, discharging from the compartment through the pipe 44 and returning through the pipe 45. Suitable thermostatic means of any well-known form are preferably employed to maintain the temperature of the liquid at the upper part of the compartment 35 substantially constant. The hot liquid remains at the top of compartment 35 and does not descend and enter compartment 36, so that the liquid in compartment 36 remains cool. The eggs enter the hot liquid at the top of compartment 35, wherein they are heated, and are then moved into the cooler liquid, wherein they are cooled before being exposed to the air. The hot eggs and conveyor moving through the compartments have a tendency to raise the temperature of the liquid in compartment 36 and this temperature is reduced by cooling the oil therein. Arranged adjacent the upper end of compartment 36 is an overflow tank 46 which is kept filled by flow of liquid from compartment 36. From the tank 36, the liquid is forced by the pump 47 through the pipe 48 and discharges through the distributor pipe 49 onto the flat bottom of the trough 28, whence it flows back in a thin sheet to the compartment 36. A thin sheet of the liquid is thus continuously exposed to atmospheric temperature and the temperature of the liquid in compartment 36 is maintained at about atmospheric temperature.

The eggs to be treated are carried in open bottom trays or baskets 25 which are pivotally attached at suitable intervals to the chains 24, each basket being provided on opposite sides at the center with pins 51 which seat in suitable sockets in the conveyor chains. Each basket comprises a rectangular frame 52 provided on opposite sides with guide pins 53—54 which cooperate with suitable guide-ways to hold the basket substantially level during its movement around the conveyor path. The basket is provided with a plurality of egg-retaining leaves or plates 55, which are shaped and arranged to form egg-holding apertures 56 between them and which are movable to increase the size of the apertures, so that the eggs may be released from the basket. The leaves or plates may be formed of wire bent to the required shape or of sheet metal and I prefer to employ sheet metal. The leaves extend longitudinally of the frame 52 and are pivoted to vertically movable transverse bars 57, mounted in the guide-ways 58. The bars are normally in the depressed position, as shown in Figs. 18 and 19, and the leaves are held in a substantially horizontal position by the cross bars or wires 59 which extend across the frame below the leaves and in the vertical planes of ears 61 on the leaves, which ears are disposed between and form the aperture 56 in which the eggs are placed.

Means are provided for raising the cross bars 57 as shown in Fig. 20 to cause the leaves to rock about their pivots, thereby increasing the size of the apertures between the leaves and permitting the eggs to fall from the basket. The ears 61 remain in contact with the cross wires 59, so that as the pivots of the leaves are raised they rock about the pivots and the spaces between them are enlarged. The baskets are provided on their upper surface with a support composed of the wires 62, which form a support for the sheet of fiber board on which the eggs are supported in their crates. The eggs are contained in the crates in tiers of cellular fiber board structures and the tiers are separated by sheets of fiber board. A tier of eggs with its cellular container and supporting sheet is removed from the crate and placed on the basket with the cells in the container registering with the apertures 56 in a basket and the sheet is withdrawn, permitting the eggs to fall into the basket and then the cellular structure is removed. The eggs are placed in the baskets as they are moving up the lower runway 33 and at that portion where the eggs are placed, the runway is provided with a yielding bottom pad in the bottom, preferably consisting of a fine screen 63, to prevent breakage of very small eggs which might fall through the basket.

The basket is guided and held in substantially horizontal position by cooperation between the pins 53 and 54 and suitably disposed guide-ways. The compartment 35 is provided with two vertically disposed guides 64 and 65 with which the pins 53 and 54 contact as the basket moves downward, holding it in a horizontal position, and similar guides 66 and 67 perform the same function in compartment 36. The guides 65 and 67 are curved at their receiving ends so that slight rocking of the basket will not prevent proper engagement. At the vertical run of the conveyor, between the trough 28 and the lower runway 33, vertical guides 68 and 69 are provided for the same purpose and the guide 68 is curved at its ends for the purpose specified.

After the eggs have passed through the liquid, they pass along the inclined trough 28, wherein the greater portion of the excess liquid thereon is drained off, and thence they pass downward to the lower runway 33. At the lower part of the lower runway, means are provided for wiping the lower ends of the eggs to remove any liquid which has accumulated there, these means consisting in the present instance of the brushes 71 and 72 over which the baskets pass, the brushes being placed so that they contact with the bottoms of the eggs.

Means are provided for automatically actuating the egg-carrying baskets so that the eggs are released therefrom as the basket passes over the discharge chute 73 in the lower runway 33. The discharge chute is divided by the longitudinal and transverse walls 74 into a plurality of cells with which the eggs on the basket are moved into registry, and when the eggs are in registry with the chute cells, the basket is actuated to release the eggs in the basket and they fall into their respective cells. The walls of the chute cells are inclined slightly to bring the tier of eggs into smaller compass as they pass therethrough into the cells 75 which comprise the fiber board cell structure from an egg crate.

Pivoted to opposite sides of the lower runway 33 at the egg discharge station are two levers 76 and 77, having their adjacent ends pivoted together on a pivot 78 on which is mounted a roller 79 which normally bears against the under surface of the overhanging plate 81 disposed at the side of the runway at the center of the discharge station. The rollers 79 are disposed in the paths of the pins 51 by which the baskets are mounted on the chains. The levers 76 and 77 are bent so that their ends are disposed between the two lines of conveyor chains and each lever is provided on its end with a cam or wedge 82, the inner edges of which lie in the path of the cross bars 57 of the basket, when the cams are elevated. The two cams 82 on each side of the runway are spaced apart longitudinally, so that as the basket is moved, both bars 57 come into contact with the cams at the same time, raising both bars and releasing the eggs. Normally the cams are below the path of the cross bars 57 so that the leading cross bar is not raised by the leading cam to such height as to release any eggs. When the pin 51 contacts with the roller 79, the cams are raised, as shown in Fig. 10, the cross bars are engaged by and elevated by the cams and the eggs are released from the basket. The pin 51 is then moved from the roller 79, the cross bars drop and the basket is ready to receive another charge of eggs.

The eggs discharging from the basket fall into the cells 75 in the fiber board cellular structure which is provided with a soft, yielding bottom 83, so that the liability of breakage is reduced to a minimum. The bottom 83 is provided with a substantial handle 84 which is held by the operator. When the eggs have fallen into the cells 75, the operator lowers the plate 83 with the cellular structure 75 and the eggs into the egg crate 76' arranged therebelow and then slides the bottom 83 out, leaving the eggs in the cellular containing structure in the crate. Another cellular structure is then placed on the bottom and held below the discharge chute 73, to receive the next batch of eggs. The egg crate is open at the top and the side so that the tiers of eggs may be readily lowered into it and after the crate is full, the side and top are applied. The egg crate is supported upon the inclined shelf 85, formed of rolls 86 on which the crate rests and dogs 87 are provided for holding the crate in proper position below the discharge chute.

The basket disclosed in this application is disclosed and claimed in my application for Letters Patent Serial No. 376,239, filed April 24, 1920.

While I have described the machine as particularly adapted for treating eggs, it is to be understood that it may be employed for treating other articles and that the claims are not limited to the use of the machine for treating eggs.

I claim:

1. In a machine of the character described, a tank containing liquid, means for heating a portion of the liquid in the tank whereby zones of liquid of different temperature are produced in the tank and means for passing eggs through the liquid in the tank.

2. In a machine of the character described, a tank containing liquid, means for passing eggs into, through and out of the tank, and means for heating the liquid at the intake end of the tank.

3. In a machine of the character described, a tank containing liquid, means for passing eggs into, through and out of the tank, means for heating the liquid at the intake end of the tank and means for cooling liquid at the discharge end of the tank.

4. In a machine of the character described, a tank comprising two compartments joined together at the bottom, a supply of liquid in said tank, means for heating the liquid in one compartment and means for passing eggs through the two compartments successively.

5. In a machine of the character described, a tank comprising two compartments joined together at the bottom, a supply of liquid in said tank, means for heating the liquid at the top of one compartment, and means for passing eggs into the heated compartment and through the other compartment while maintaining their submergence in the liquid.

6. In a machine of the character described, a tank comprising two compartments joined together at the bottom, a supply of liquid in said tank, means for heating the liquid in one compartment, means for cooling the liquid in the other compartment and means for passing eggs through the first and second compartments successively while maintaining their submergence.

7. In a machine of the character described, a tank comprising two compartments connected together at the bottom, each compartment extending above the point of connection, a supply of liquid in said tank, a heater associated with the first compartment and a conveyor extending successively through the first and second compartment.

8. In a machine of the character described, a tank comprising two compartments connected together at the bottom, each compartment extending above the point of connection, a supply of liquid in said tank, means for heating the liquid in one compartment, a conveyor extending through said compartments and egg-carrying means arranged on the conveyor.

9. In a machine of the character described, a tank, a supply of liquid in said tank, means for heating a portion of said liquid, a conveyor arranged in said tank and submerged in the liquid therein and egg-carrying means on said conveyor.

10. In a machine of the character described, a tank having inlet and outlet portions, a conveyor extending through said tank from the inlet to the outlet, a body of liquid in said tank, means for heating the liquid adjacent the inlet end of the tank and egg-carrying means arranged on said conveyor.

11. In a machine of the character described, a moving conveyor, an egg carrier carried by said conveyor, and means for releasing the eggs through the bottom of the carrier.

12. In a machine of the character described, a conveyor, an egg-carrying basket on said conveyor, means for releasing the eggs from the basket, and means operative by the movement of the conveyor for operating said releasing means.

13. In a machine of the character described, a moving conveyor, an egg carrier carried by the conveyor in which eggs may be carried, an egg discharge station arranged below the conveyor, and means arranged at the egg-discharge station for releasing the eggs.

14. In a machine of the character described, a conveyor, an egg carrying basket on said conveyor, and means actuated by the movement of the conveyor for releasing the eggs from said basket.

15. In a machine of the character described, a conveyor, a basket carried by said conveyor, movable members on said basket for holding the eggs, and means for moving said members to release the eggs from the basket.

16. In a machine of the character described, a conveyor, a basket carried by said conveyor, a plurality of movable members forming the bottom of said basket on which eggs rest, and means for moving said members to permit the eggs to fall through said bottom.

17. In a machine of the character described, a conveyor, a basket carried by said conveyor, a plurality of hinged members forming the bottom of said basket on which the eggs rest, and means for moving said members about their pivots to permit the eggs to fall through said bottom.

18. In a machine of the character described, a conveyor, an egg-carrying basket on said conveyor, a plurality of movable members forming the bottom of said basket, and means operated by the movement of the conveyor for moving said members to permit the eggs to fall through said bottom.

19. In a device for treating eggs, means for imparting heat to the eggs sufficient to expand the pores of the egg shell, means for covering the egg with a preserving liquid while it is in a heated condition, and means for cooling the eggs while still covered with the preservative.

20. In a machine of the character described, a conveyor, an egg-carrying basket on said conveyor, a plurality of movable members forming the bottom of said basket, and levers arranged to be actuated by the movement of the conveyor adapted to move said members to open the bottom of the basket.

21. In a machine of the character described, a conveyor, a basket on said conveyor adapted to carry a plurality of rows of eggs, a plurality of chutes arranged below the conveyor and adapted to receive the eggs from said basket, and means for releasing the eggs from the basket when the basket is over said cells.

22. In a machine of the character described, a continuously movable conveyor, a basket adapted to carry a plurality of rows of eggs carried by said conveyor, an egg receiver arranged below said conveyor and means actuated by the movement of the conveyor for releasing the eggs from the basket as the basket passes over the egg receiver.

23. In a machine of the character described, a conveyor, a basket adapted to carry a plurality of eggs arranged on said conveyor, a cellular egg holding structure arranged below the conveyor, and means for discharging the eggs from the basket into said structure.

24. In a machine of the character described, a conveyor, a basket adapted to carry a plurality of eggs carried by the conveyor, a plate arranged below the conveyor, a cellular egg holding structure on said plate and means for discharging the eggs from the basket onto said plate and into the cells of the structure.

25. In a machine of the character described, a conveyor, a tank through which said conveyor passes, and a trough discharging into the tank through which the conveyor passes after it leaves the tank.

26. In a machine of the character described, a conveyor, a tank through which said conveyor passes, a trough draining into said tank and means for pumping liquid from said tank into said trough.

27. In a machine of the character described, an endless conveyor, a plurality of egg-carrying baskets mounted on said conveyor, a tank containing liquid through which said conveyor passes, means for heating the liquid at the intake end of said tank, a trough through which the conveyor passes from said tank and means for pumping liquid from the outlet end of said tank into said trough.

28. In a machine of the character described, a moving conveyor, an egg carrier carried by said conveyor, means for releasing the eggs from the carrier, and means responsive to the movement of the carrier to a definite position for operating said releasing means.

29. In a machine of the character described, a continuously movable conveyor, a basket adapted to carry a plurality of eggs carried by said conveyor, and means for releasing the eggs from the basket while the conveyor is in motion.

In testimony whereof, I have hereunto set my hand.

MORRIS KASSER.